Dec. 16, 1952  J. G. HODGENS, JR  2,621,673
ELECTRONIC SOLUTION CONTROL APPARATUS
Filed June 12, 1948   2 SHEETS—SHEET 1

Inventor
John G. Hodgens Jr.
By Milton Jones
Attorney

Dec. 16, 1952  J. G. HODGENS, JR  2,621,673
ELECTRONIC SOLUTION CONTROL APPARATUS
Filed June 12, 1948  2 SHEETS—SHEET 2
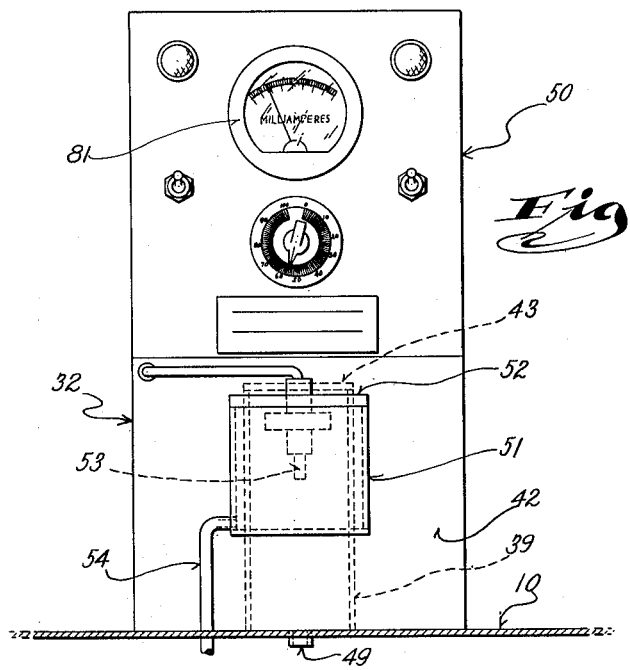
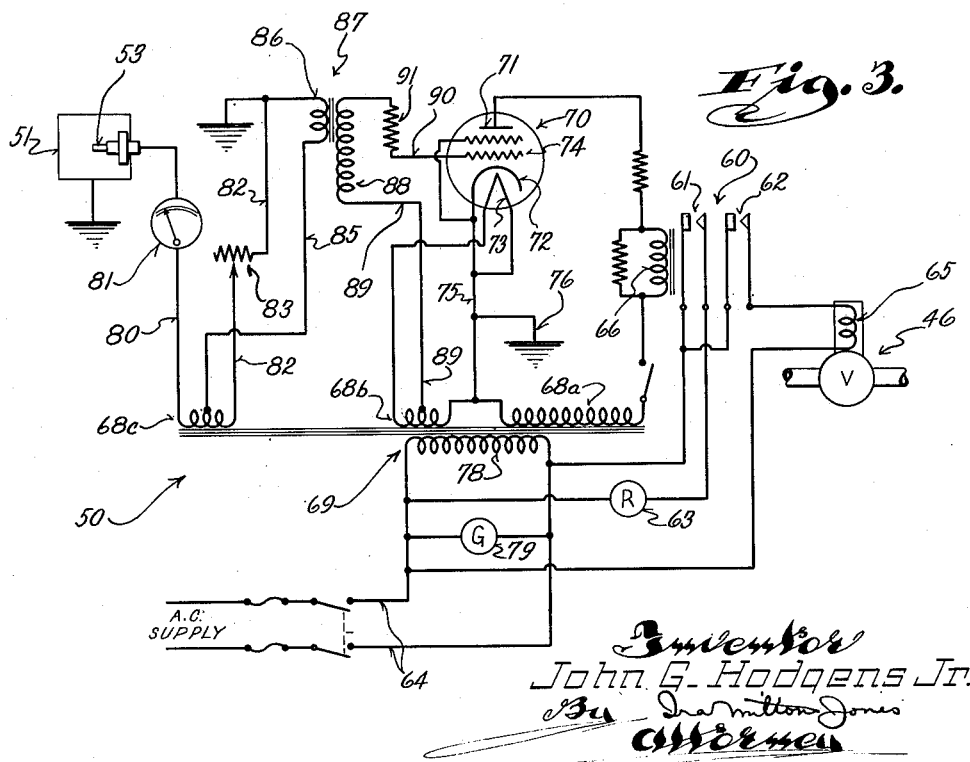
Inventor
John G. Hodgens Jr.

Patented Dec. 16, 1952

2,621,673

UNITED STATES PATENT OFFICE 2,621,673

ELECTRONIC SOLUTION CONTROL APPARATUS

John G. Hodgens, Jr., Chippewa Falls, Wis.

Application June 12, 1948, Serial No. 32,640

8 Claims. (Cl. 137—93)

This invention, like my copending application entitled Electronic Solution Control Apparatus, filed May 2, 1945, Serial No. 591,489, now abandoned; relates to the control of solutions such as are used in washing or the treatment of various articles, and has for its primary object the provision of an electrical control system for automatically maintaining a solution at a predetermined concentration.

As brought out at length in the aforesaid copending application, the washing and/or treating solutions to be controlled are such as are employed in dishwashing machines or in apparatus for the cleaning of bottles, cans or other receptacles.

Inasmuch as such solutions may be either alkaline or acid in nature and are subject to change in concentration in the course of continued use, it is frequently necessary to supply a regenerating medium to the solution liquor in order to maintain it at a predetermined concentration most desirable for the operation being performed. In the case of alkaline washing liquor the concentration of the solution is lowered by continued use or through the addition of clean rinse water to the solution supply. Acid solutions, however, usually tend to become stronger than desired through continued use so that their regeneration is effected by the addition of water or some other dilutent which lowers the concentration to a predetermined value.

In the control apparatus of my copending application previously referred to, a regenerating medium was added to the solution supply whenever necessary, in response to changes in the electrical resistance of the solution. For this purpose a pair of electrodes was mounted in the tank or receptacle containing the solution, and the addition of the regenerating medium to the supply of solution was controlled by electronic control apparatus sensitive to changes in the electrical resistance of the solution across the pair of electrodes.

Inasmuch as the two electrodes previously employed were isolated from ground and were mounted in the solution tank, which was grounded, current leakage from the electrodes to ground was unavoidable. Whenever such current leakage occurred the electronic control apparatus became unreliable with the result that it was almost impossible at such times to maintain the solution at the predetermined concentration.

With this objection in mind the present invention overcomes the disadvantages resulting from current leakage in the manner described, and it is therefore an object of this invention to provide an electronic solution control apparatus having means for detecting the electrical resistance of the solution which is to be controlled which detecting means includes a pair of electrodes, one of which is grounded.

More specifically it is an object of this invention to provide an electronic solution control apparatus of the character described provided with a metallic electrically grounded test cell through which the solution is adapted to be circulated so that detection of the electrical resistance of the solution can take place between the metallic test cell and an electrode which is mounted within the test cell to be immersed in the solution circulated therethrough but which is isolated from ground.

Several advantages result from the provision of a test cell of the character described. The electrode mounted in the test cell may be relatively small, whereas previously, when a pair of electrodes was provided for the purpose, the electrodes had to be of relatively large size so as to present large opposing surfaces to thus minimize current leakage to ground.

Moreover the test cell may be mounted anywhere in the vicinity of the solution tank or reservoir so as to be readily accessible for visual inspection of the physical characteristics of the solution circulated therethrough as well as for the inspection and cleaning of the electrode mounted therein. The advantage of having the test cell and the single electrode readily accessible will be appreciated, since in the past access to the pair of electrodes immersed in the solution supply tank itself practically necessitated dismantling the entire washing apparatus, while visual inspection of the physical characteristics of the solution was next to impossible.

Another object of this invention resides in the provision of a unitary electronic control instrumentality capable of being completely assembled and tested in the factory and easily attached to any washing apparatus in the field, thus eliminating the possibility of improper wiring during installation in the field.

Still another object of this invention resides in providing electronic solution control apparatus of the character described with a metallic test cell incorporating a single electrode and through which the solution to be tested is circulated at a relatively fast rate so as to have a cleaning or abrasive effect upon the electrode to preclude deposit of solid waste materials thereon. A further advantage of this cell and electrode construction resides in the fact that the electrode may conveniently be made of the same material as the cell to preclude electrolytic action between the detecting elements.

A further object of this invention resides in the provision of a solution control apparatus having an electrical instrumentality which will at all times provide a visual indication of the effectiveness or concentration of the solution being controlled. Previously, accurate determination of the concentration of the solution was had only by titration, and as a result the actual strength of the solution would seldom be accurately checked because of the lack of skilled operators or lack of time required to conduct titration tests. Consequently unwarranted reliance was placed upon the electronic controls for governing the concentration of the solution and frequently the concentration varied considerably without the knowledge of the operator of the apparatus.

A further object of this invention resides in the provision of improved electronic apparatus for controlling the addition of a regenerating medium to a supply of solution and for simplifying and reducing the costs of the electrical controls.

With the above and other objects in view, which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed according to the best mode so far devised for the practical application of the principles thereof, and in which:

Figure 2 is a front elevation of the electronic control apparatus shown in Figure 1; and Figure 3 is an electrical diagram of the electronic apparatus.

Figure 1:
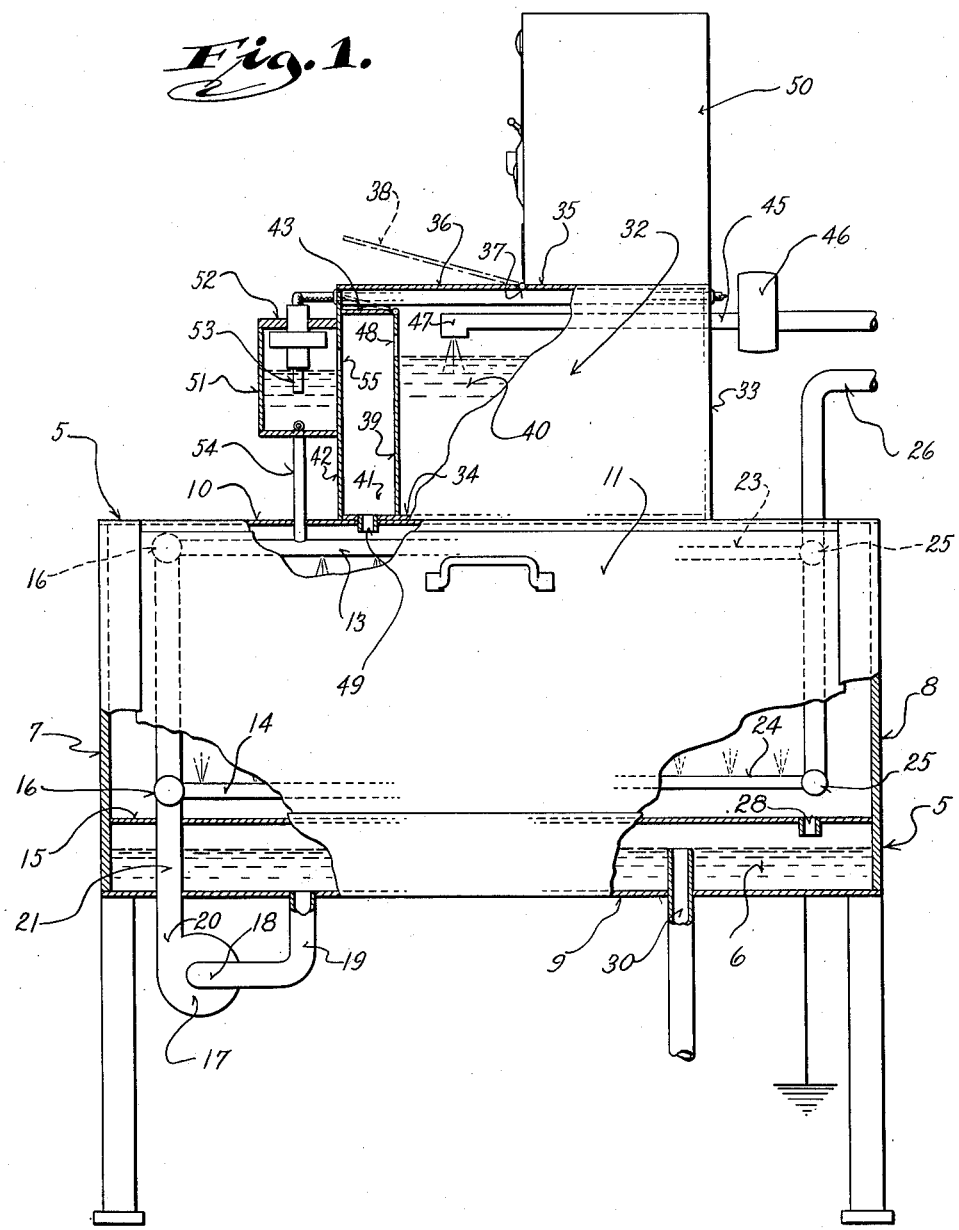
Figure 1 is a side elevational view of a dish washing device illustrating the application of the electronic control apparatus of this invention thereto, part of the washing device and the control apparatus being broken away and shown in section to illustrate details of construction.

Referring now more particularly to the accompanying drawings in which like numerals indicate like parts, the numeral 5 represents a tank or reservoir adapted to contain a supply of solution 6. Merely for the sake of illustration, the tank or reservoir 5 has been shown as part of a dish washing machine, and in this instance the solution 6 would be an alkaline washing solution.

The dish washing machine illustrated is of conventional construction in that it is provided with upright front and back walls 7 and 8 respectively. At least one side wall 11 has its upper portion vertically movable to provide for loading and unloading of the washer.

Dishes loaded into the machine for washing are adapted to have washing solution sprayed thereon by means of horizontal pipes 13 and 14, the pipes 13 being located beneath the top wall 10 and the pipes 14 being located just above a false bottom 15 in the tank above the level of solution normally maintained therein. The spray pipes 13 and 14 connect with headers 16 into which the washing solution is conducted by means of a pump 17, the inlet 18 of the pump being communicated with the reservoir through an inlet pipe 19 and the outlet 20 of the pump being communicated with the headers 16 through a pipe 21.

A second set of upper and lower spray pipes 23 and 24 respectively for rinsing of the washed dishes, is interleaved between the pipes 13 and 14 and these rinsing spray pipes 23 and 24 are supplied with fresh water through a pipe 26 connected with them through headers 25.

In the washing device shown, soiled dishes are loaded into the device and cleaned by spraying them with washing solution for a suitable length of time, the spray impinging against them from top and bottom. After the washing operation the pump 17 is stopped and clean rinse water is fed into the rinsing spray pipes 23 and 24 under the control of a valve (not shown) so as to rinse the washing solution from the dishes. After a suitable rinsing period the hot rinse water is shut off and the dishes are removed through the supply door 11.

The washing solution sprayed upon the dishes falls to the false bottom 15 of the washer and drains into the reservoir 5 through an opening 28 in the false bottom. The opening is preferably provided with a screen (not shown). The washing solution which thus drains into the reservoir is recirculated through the spray pipes 13 and 14 by the pump 17.

The rinse water sprayed upon the dishes by means of rinsing spray pipes 23 and 24 also collects upon the false bottom 15 and likewise runs into the reservoir 5 through the opening 28. The addition of the rinse water to the reservoir 5, of course, tends to raise the level of the solution in the reservoir but the solution is prevented from rising above a predetermined level by means of an overflow pipe 30 having its inlet spaced a distance above the bottom of the reservoir and its discharge end projecting through the bottom of the reservoir to connect with a sewer (not shown).

Hence, it will be seen that the clean rinse water dilutes the washing solution to an extent which depends upon the duration of the rinsing operation, and that from time to time concentrated washing material must be added to the reservoir 5 to bring the solution up to the proper concentration. A regenerating device 32 is provided for this purpose.

The regenerating device 32 is a unit separate from the washing machine and is preferably mounted alongside the washer or directly upon the top wall 10 of the washer as illustrated. The device comprises a box-like housing 33 having a bottom wall 34 and upright side and end walls. A top wall 35 closes the entire top of the housing, but has a front section 36 hinged as at 37 to swing to an open position, illustrated at 38, providing access to the interior of the regenerating device. The interior of the housing is divided by an upright partition 39 into a main compartment 40 adapted to contain a powdered concentrated washing material and an overflow compartment 41 adjacent to the front wall 42 of the housing. The partition 39 extends upwardly to a point near the top of the housing and has a top closure 43 hingedly mounted thereon to swing to and from a position closing the upper end of the overflow compartment 41.

Regeneration of the solution in the reservoir 5 is effected by introducing water into the main compartment of the regenerating device through a pipe line 45 controlled by an electromagnetically operated valve 46. The pipe line 45 enters the back of the housing 33 and has a downwardly directed nozzle 47 on its inner end through which water is sprayed onto the powdered concentrated washing material in the regenerating device to dissolve the same. The resulting concentrated solution overflows into the overflow chamber 41 through an opening 48 in the partition 39 near the upper portion thereof, and the concentrated washing solution in the chamber 41 in the present instance is delivered to the interior of the washer through a nipple 49 carried by the bottom wall 34 of the regenerating device and projecting through a suitable opening in the top wall 10 of the washer. Hence the concentrated solution is conducted into the reservoir 5 through the opening 28 in the false bottom 15 and is mixed with the solution to increase the effectiveness or concentration thereof.

As stated, however, regeneration can take place only upon energization of the electromagnetic valve 46 to effect opening of the valve and to thus allow water to flow through the pipe line 45 and the spray nozzle 47 into the main compartment of the regenerating device. The valve 46 is controlled by means of an electronic control apparatus 50 mounted on the top of the regenerating device 32 and adapted to be rendered operative and inoperative by changes in the electrical resistance of the washing solution 6 brought about by changes in its concentration. When the washing solution becomes weaker, in consequence to dilution by rinse water, its electrical resistance increases, while if for any reason its concentration should become higher than desired its electrical resistance would decrease.

The electronic control apparatus 50 includes means for detecting the electrical resistance of the solution and in the present case this detecting means is of improved design. Previously a pair of electrodes, isolated from ground, were arranged to be immersed in the washing solution contained within the reservoir and were connected across a source of E. M. F. in a Wheatstone bridge circuit so that the resistance of the solution between the electrodes constituted the variable resistance of the bridge. Whenever the solution lost effectiveness or became weaker the bridge became unbalanced by the increased resistance across the pair of electrodes and the electronic control apparatus was thus caused to initiate regeneration of the washing solution.

In the present invention the electronic control apparatus is provided with a test cell 51 mounted on the front wall 42 of the housing of the regenerating device 32. The test cell comprises a metal receptacle having an open top which may be closed by a cover 52. A single electrode 53 is attached to the cover but is electrically insulated from the cover and from the walls of the receptacle and it is adapted to be immersed in washing solution.

Solution is constantly introduced into the test cell from the reservoir 5 by means of a branch pipe 54 which leads into the cell at one side thereof near the bottom of the cell and which is joined with the outlet of the pump 17 in any suitable manner. For convenience the branch pipe 54 has been shown extending vertically downwardly from the test cell through an opening in the top wall of the washer and connecting with one of the solution spray pipes 13 adjacent to the upper wall of the washer. An overflow port 55 in the end wall 42 of the regenerating device housing discharges into the overflow chamber 41 and assures that the solution thus delivered to the test cell will be maintained at a predetermined level at which the electrode 53 is immersed therein. Thus whenever regeneration is taking place, it will be seen that the washing solution entering the overflow chamber 41 from the test cell is caused to admix with the concentrated washing liquor overflowing from the main chamber of the regenerating device into the overflow chamber, and that these liquors are returned to the reservoir 5 through the openings 49 and 28.

One of the important features of this invention resides in the fact that the test cell is made of metal and is electrically grounded through the housing of the regenerating device and the metallic shell of the washer. Hence the test cell itself acts as an electrode cooperating with the electrode 53 to provide detecting means by which the resistance of the washing solution delivered to the test cell is detected and impressed upon the electrical instrumentalities of the electronic control apparatus. The electrode 53 is preferably made of the same metal as the test cell to preclude destructive electrolytic action between the electrode and the inner surfaces of the cell.

Another highly important advantage resulting from the provision of the test cell is that the electrode 53 is readily accessible by removal of the cover 52 of the cell to enable inspection or cleaning of the electrode. Obviously this construction also permits visual inspection of the physical characteristics of the solution in the test cell by removal of its cover 52.

Although the electrode 53 is readily accessible for removal, it is seldom necessary to clean it since the forceful circulation of washing solution through the test cell exerts an abrasive or cleansing action upon the electrode tending to keep it clean.

The electrical control apparatus 50 includes an electromagnetic switch 60 having two sets of contacts 61 and 62 which are caused to close whenever the switch is energized in consequence to an increase in the resistance of the solution above that obtaining at its desired concentration. Closure of the switch contacts 62 connects the coil 65 of the electromagnetic valve 46 with a source 64 of 110 volt alternating current to effect energization of the coil and opening of the valve to allow water to discharge into the main compartment of the regenerating device through the spray nozzle 47, consequently effecting the transfer of regenerating liquor to the reservoir 5. Closure of the contacts 61 connects a red signal lamp 63 with the supply lines 64 thus lighting the lamp to indicate that regeneration is taking place.

The energization circuit for the solenoid 66 of the switch 60 includes a secondary 68a of a main transformer 69 and a thermionic tube 70 which may be any one of a number of different types but which is here illustrated as a Thyratron. The Thyratron has a plate 71, a cathode 72 indirectly heated by a filament 73 connected across another secondary winding 68b of the main transformer, and a control grid 74 interposed between the plate and the cathode.

Attention is directed to the fact that the secondary 68a is in series circuit with the secondary 68b and that the conductor 75 which connects the cathode with the secondary 68a comprises one of the supply lines for the filament 73 and is grounded as at 76 so that the filament and cathode operate at ground potential. This gives the advantage of longer tube life.

Since the cathode 72 is connected with one end of the secondary 68a and the plate 71 is connected with the opposite end of the secondary 68a through the solenoid 66, it will be apparent that the plate circuit of the Thyratron constitutes the energizing circuit for the switch 60.

The primary 78 of the main transformer 69 is of course connected across the supply line 64, and a green signal lamp 79, likewise connected across the lines 64, is adapted to be lighted as long as the electronic control apparatus is in operative condition.

It will be evident from the description thus far that whenever the Thyratron 70 is rendered conductive the electromagnetic switch 60 will be closed to effect opening of the water supply valve 46 and regeneration of the solution in the reservoir 5. When the Thyratron is non-conductive the energizing circuit for the switch 60 is broken and the electronic valve 46 returns to its normally closed position terminating regeneration.

In order to utilize changes in electrical resistance of the solution to render the Thyratron conductive and thus to initiate regeneration of the solution the electrode 53 is connected in a control circuit which is energized by a third secondary winding 68c of the main transformer which, being center-tapped, provides a three wire current source.

The electrode 53 is connected to one end of the secondary 68c by means of a conductor 80 having a current indicating device 81 connected therein. The indicating device 81 is preferably a milliammeter having conventional calibration on its face or it may be calibrated to denote the strength of the washing solution employed.

The other end of the secondary 68c is connected to ground through a conductor 82 having an adjustable resistance 83 embodied therein. Since the metallic test cell 51 is grounded it will be apparent from Figure 3 that closure of the line switch across the lines 64 to render the main transformer operative will energize an indicating circuit which includes the secondary 68c, the effective resistance of the adjustable resistance 83, the milliammeter 81 and the resistance of the solution between the electrode 53 and the grounded metallic case of the test cell.

The milliammeter 81 is of course mounted on the front of the housing for the electronic control apparatus so as to be readily visible to an operator of the washer. Consequently when the reading of the milliammeter decreases from a predetermined reading corresponding to that for the desired concentration of the solution it will immediately indicate to the operator that the solution is weaker than desired. The milliammeter thus provides constant and accurate indication of the strength of the solution, as determined by the current flow between the electrode 53 and the metallic case of the test cell.

The secondary 68c also has a center tap conductor 85 connected therewith leading to one end of the primary 86 of a step-up transformer 87. The other end of the primary 86 is grounded through the end of the conductor 82. The center tapped secondary thus provides a three-wire alternating current source which energizes two normally balanced circuits. One of these balanced circuits includes the conductor 82 and the adjustable resistance 83 therein, the primary of the transformer 87 and the conductor 85; while the other of said circuits leads through the conductor 80, the milliammeter 81, the electrode 53, the solution in the test cell, the grounded metal case of the cell, and through the grounded side of the primary 86 of the transformer 87 and the conductor 85 to the center tap of the secondary 68c. It will be noted that the primary 86 and the center tap conductor 85 are common to both of these circuits.

The adjustable resistance 83 in the conductor 82 is set to balance the two circuits having the conductor 85 in common when the resistance across the solution in the test cell is at a predetermined value corresponding to the desired concentration. In this condition the impedances of the two circuits balance and the conductor 85 is neutral, that is, no current flows therein or through the primary 86 of the transformer 87. The indicating circuit across the entire secondary 68c and including the conductors 80 and 82 will of course continue to be operative.

When the solution in the reservoir of the washer becomes weaker as a result of dilution with rinse water sprayed upon the dishes the impedance of the circuit which includes the conductors 80 and 85 will rise so that this circuit no longer balances with the circuit through the conductors 82 and 85.

Hence, current will flow from the secondary 68c through the primary 86 of the transformer 87 to induce a voltage in the secondary 88 of the step-up transformer, and this induced voltage will be 180° out of phase with the voltage induced in the secondary 68b which furnishes bias to the control grid 74 of the Thyratron 70. It will thus be seen that the normally balanced circuits including the conductors 80 and 82 and having the conductor 85 in common comprise a phase shifting network which is employed to induce a voltage in the secondary 88 of the transformer 87 capable of offsetting the voltage impressed upon the control grid 74 by the secondary 68b, thereby producing a net voltage on the grid which is less than its critical voltage so that the tube is rendered conductive.

The connections by which the voltage induced in the secondary 88 offsets that induced in the secondary 68b comprise a conductor 89 connected with one end of the secondary 88 and connecting with a center tap on the secondary 68b, and a conductor 90 joined with the opposite end of the secondary 88 and leading to the control grid 74 through a resistor 91.

Whenever the solution in the washer is at the desired concentration no voltage is induced in the secondary 88 of the transformer 87 and the Thyratron remains nonconductive because a sufficiently high bias voltage is impressed upon the control grid 74. When the concentration of the solution drops, however, the Thyratron is rendered conductive in the manner hereinbefore described so that current flowing in the plate circuit of the Thyratron energizes the solenoid 66 of the switch 60. The switch contacts 62 and 61 are thus closed, completing circuits which respectively open the water supply valve 46 to initiate regeneration and light the red signal lamp 63 to indicate that regeneration is taking place.

Such regeneration continues until the solution is brought back to desired concentration, when the impedance in the test cell circuit including the conductors 80 and 85 substantially balances that of the variable resistance circuit including the conductors 82 and 85, and current flow in the primary of the step-up transformer has diminished to the point where the secondary 88 of the transformer 87 has no influence upon the voltage induced in the secondary 68b, so that the bias on the control grid 74 of the Thyratron is restored to its value above the critical firing value of the tube and the tube is rendered inoperative. Consequently the electronic switch 60 opens and the resulting deenergization of the water supply valve 46 causes the supply of water to the regenerating device to be shut off.

If for any reason the concentration of the washing solution exceeds the desired concentration, as may happen during periods of nonuse due to evaporation of water from the solution, the test cell and variable resistance circuits are again unbalanced by reason of the lowered resistance to current flow from the electrode 53 through the solution in the test cell to the metal case of the cell. In this event the primary 86 of the transformer 87 is again energized by current flowing in the test cell circuit, but in this case the current flow in the primary 86 is of such phase as to induce a voltage in the secondary 88 of the transformer 87 which is in phase with the voltage induced in the secondary 68b so that the two voltages combine to produce a total biasing voltage on the control grid 74 which is higher than that required to maintain the Thyratron inoperative. Hence it will be apparent that the Thyratron is rendered operative or conductive only upon loss of concentration or effectiveness of the washing solution.

It is extremely important that the primary 86 of the transformer 87 be so connected in the normally balanced test cell and variable resistance circuits that the voltage induced in the secondary 88 will be of opposite phase to that induced in the secondary 68b only when the concentration of the washing solution is below normal.

The adjustable resistance 83 in the conductor 82 in effect corresponds to the resistance of the solution when the same is at a predetermined desired concentration, and it will be obvious that the adjustable resistance may be set to balance the test cell and variable resistance circuits to provide a solution having the degree of concentration desired to be used in the washer.

While the electronic control apparatus 50 has been described as governing the transfer of a concentrated regenerating liquor to a washing solution, it will be appreciated that reversal of the leads of the primary 86 of the transformer 87 renders the apparatus useful for maintaining an acid solution at a predetermined concentration. In this case the regenerating medium would be plain water or any other suitable diluent, and addition of the diluent would likewise be controlled by means of the electromagnetic valve 46. Hence the use of the term "regenerating medium" is intended to embrace not only a concentrated liquor but a diluent as well.

From the foregoing description taken in connection with the accompanying drawings, it will be readily apparent to those skilled in the art that this invention provides an electronic solution control apparatus which enables the use of but a single electrode cooperable with the metal case of a test cell in which it is mounted, and that the electrode is thus not only readily accessible but may be made relatively small since the control circuit in which the electrode is connected operates at ground potential. It will also be apparent that the control apparatus, including the resistance detecting means, is of unitary construction capable of being assembled and tested at the factory so as to eliminate any possibility of installation errors during connection of the apparatus to washing or other equipment. Moreover the control apparatus of this invention is materially simplified and rendered highly accurate through the use of normally balanced circuits depending for their balance upon the resistance of the solution being used.

What I claim as my invention is:

1. In apparatus having a receptacle adapted to contain a solution: a regenerating device mounted adjacent to said receptacle and adapted to contain a quantity of concentrated regenerating material; electronic control instrumentalities for controlling said regenerating device in accordance with the electrical resistance of the solution; means forming a part of said electronic control instrumentalities for detecting the electrical resistance of the solution, said detecting means comprising an electrically grounded test cell through which solution from the receptacle may be circulated, and an electrode mounted in said test cell to be immersed in solution circulated through the cell, said electrode being electrically insulated from ground; means for continuously introducing solution from said receptacle into the test cell; and a common chamber communicating said test cell with the receptacle and said regenerating device with the receptacle whereby concentrated solution from the regenerating device is introduced into the receptacle along with solution returning to the receptacle from the test cell to effect premixing of said concentrated solution.

2. Solution control apparatus of the character described, comprising: means defining a premixing chamber having outlet means for connecting said chamber with a supply of solution which requires regeneration from time to time; means defining a solution testing cell alongside the premixing chamber and into which solution from the supply thereof may be delivered; means communicating said testing cell with the premixing chamber at a level spaced a distance above the bottom of the cell so that solution delivered to the cell will fill the same to said level and will overflow into the premixing chamber for return to the supply of solution; means in said testing cell for detecting a characteristic of solution in the cell which is dependent upon and varies with the concentration of the solution; a regenerating vessel alongside the premixing chamber; means communicating said vessel with the premixing chamber at an elevation on the regenerating vessel spaced a distance above the bottom thereof so that liquid delivered to the regenerating vessel will maintain the same filled and will overflow into the premixing chamber; and means controlled by said detecting means for effecting delivery of liquid to the regenerating vessel to cause the contents of the same to overflow into the mixing chamber.

3. In apparatus of the character described: a receptacle for holding a supply of solution; means defining a test cell; supply and return duct means connecting the test cell with the receptacle; means for circulating solution from the receptacle through said duct means into the test cell and back to the receptacle; means defining a mixing chamber in said return duct means; a regenerating vessel adapted to hold regenerating liquid; means communicating the regenerating vessel with the mixing chamber to provide for the transfer of regenerating liquid from the regenerating vessel to the mixing chamber for admixture with solution circulating through the mixing chamber and returning to the receptacle; detecting means in said test cell for detecting a characteristic of the solution which is dependent upon and varies with its concentration before the solution is received in the mixing chamber; and means controlled by said detecting means for effecting transfer of regenerating liquid from the regenerating vessel to the mixing chamber, the regenerating liquid thus transferred mixing with solution circulated through the mixing chamber and returning to the receptacle through said return duct means.

4. Solution control apparatus of the character described, comprising: a mixing chamber; a test cell adjacent to the mixing chamber and having an inlet through which solution from a supply thereof to be controlled may be admitted into the cell for circulation therethrough; detecting means in said test cell for detecting a characteristic of the solution which is dependent upon and varies with its concentration; a regenerating vessel adjacent to the mixing chamber and adapted to hold a quantity of regenerating medium; means communicating the test cell with the mixing chamber and by which solution is discharged from the test cell into the mixing chamber; means communicating the regenerating vessel with the mixing chamber to provide for the transfer of regenerating medium from the regenerating vessel to the mixing chamber for admixture with solution received therein from the test cell; outlet means in the lower portion of said mixing chamber through which solution received in the mixing chamber may flow for passage to the supply of solution along with regenerating medium transferred to the mixing chamber from the regenerating vessel; and means controlled by said detecting means for effecting transfer of regenerating medium from the regenerating vessel to the mixing chamber.

5. In apparatus of the character described: a receptacle for holding solution; a vessel mounted above said receptacle, adjacent thereto, and adapted to hold concentrated regenerating liquid; a test cell mounted adjacent to said vessel; electrode means in said test cell for detecting a characteristic of said solution which is dependent upon and varies with its concentration; means for continuously introducing solution from said receptacle into the test cell; means including a wall of said vessel and a wall of said test cell defining a mixing chamber; means communicating the test cell with the mixing chamber and by which solution is discharged from the test cell into the mixing chamber; means communicating the regenerating vessel with the mixing chamber to provide for transfer of regenerating liquid from the regenerating vessel to the mixing chamber for mixture with solution received therein from the test cell; means at the bottom of the mixing chamber for conducting solution and regenerating liquid admixed therewith to the receptacle; and means controlled by said electrode means for effecting transfer of regenerating liquid to the mixing chamber from the regenerating vessel.

6. The apparatus of claim 5, wherein said means communicating the regenerating vessel and the test cell with the mixing chamber comprises overflow holes in said walls which the mixing chamber has in common with the test cell and regenerating vessel, said holes being located in areas of said walls spaced from the top and bottom of the test cell and the regenerating vessel to thereby maintain predetermined levels of solution and regenerating liquid in the test cell and regenerating vessel during operation of the apparatus, and wherein liquid is introduced into the regenerating vessel by said electrode controlled means so as to effect overflow of regenerating liquid into the mixing chamber through the overflow hole of the regenerating vessel.

7. In a unit for testing a solution and regenerating a supply of such solution: a receptacle; partition means in said receptacle dividing the same into a concentrate vessel adapted to hold concentrated regenerating medium, and an overflow chamber for receiving regenerating liquid overflowing from said vessel, said overflow chamber having outlet means at its bottom; means including a wall of the overflow chamber defining a test cell through which solution from a supply thereof may be circulated, said test cell having an inlet to admit solution thereto and having overflow communication with the overflow chamber so that solution circulating through the test cell overflows into the chamber to be mixed with concentrated regenerating liquid received therein from the regenerating vessel to thus assure dilution of the regenerating liquid by solution received in the overflow chamber, and premixing of the regenerating liquid with said solution before passing through the outlet means at the bottom of the overflow chamber to the supply of solution to be regenerated; means in the test cell for detecting the concentration of the solution introduced into the test cell; and means controlled by said detecting means for effecting the addition of liquid to the regenerating vessel to cause regenerating liquid therein to overflow into the overflow chamber.

8. In apparatus having a receptacle adapted to contain solution: a regenerating device adapted to contain a regenerating medium; electronic control instrumentalities for controlling said regenerating device to effect transfer of regenerating medium from the regenerating device to the receptacle in accordance with the electrical resistance of the solution; means forming a part of said electronic control instrumentalities for detecting the electrical resistance of the solution, said detecting means comprising a test cell through which solution from the receptacle may be circulated; means for continuously introducing solution from said receptacle into the test cell; and a common chamber communicating said test cell with the receptacle and said regenerating device with the receptacle, whereby during the transfer of regenerating medium from the regenerating device to the receptacle the regenerating medium is first introduced into said chamber, along with solution returning to the receptacle from the test cell, to effect premixing of the regenerating medium with said returning solution.

JOHN G. HODGENS, Jr.

REFERENCES CITED

The following references are of record in the file of this patent:

UNITED STATES PATENTS

| Number | Name | Date |
|---|---|---|
| 1,027,755 | Pickard | May 28, 1912 |
| 1,558,060 | Stead | Oct. 20, 1925 |
| 1,576,001 | Olden | Mar. 9, 1926 |
| 1,694,264 | Hull | Dec. 4, 1928 |
| 1,701,331 | Merrill | Feb. 5, 1929 |
| 1,870,982 | Behr | Aug. 9, 1932 |
| 1,951,035 | Parker | Mar. 13, 1934 |
| 2,006,085 | Lehmkuhl | June 25, 1935 |
| 2,038,260 | Ash | Apr. 21, 1936 |
| 2,176,471 | Pyle | Oct. 17, 1939 |
| 2,258,045 | Christie | Oct. 7, 1941 |
| 2,266,205 | Hunter | Dec. 16, 1941 |
| 2,333,446 | Rogers | Nov. 2, 1942 |
| 2,350,378 | Wallace | June 6, 1944 |
| 2,370,609 | Wilson et al. | Feb. 27, 1945 |
| 2,377,363 | Noble | June 5, 1945 |
| 2,411,888 | Long et al. | Dec. 3, 1946 |
| 2,413,020 | Wolfner | Dec. 24, 1946 |
| 2,422,873 | Wolfner | June 24, 1947 |
| 2,500,042 | Nutting et al. | Mar. 7, 1950 |